March 9, 1926.  1,575,706
J. F. O'CONNOR
FRICTION SHOCK ABSORBING MECHANISM
Filed Jan. 30, 1922  2 Sheets-Sheet 1
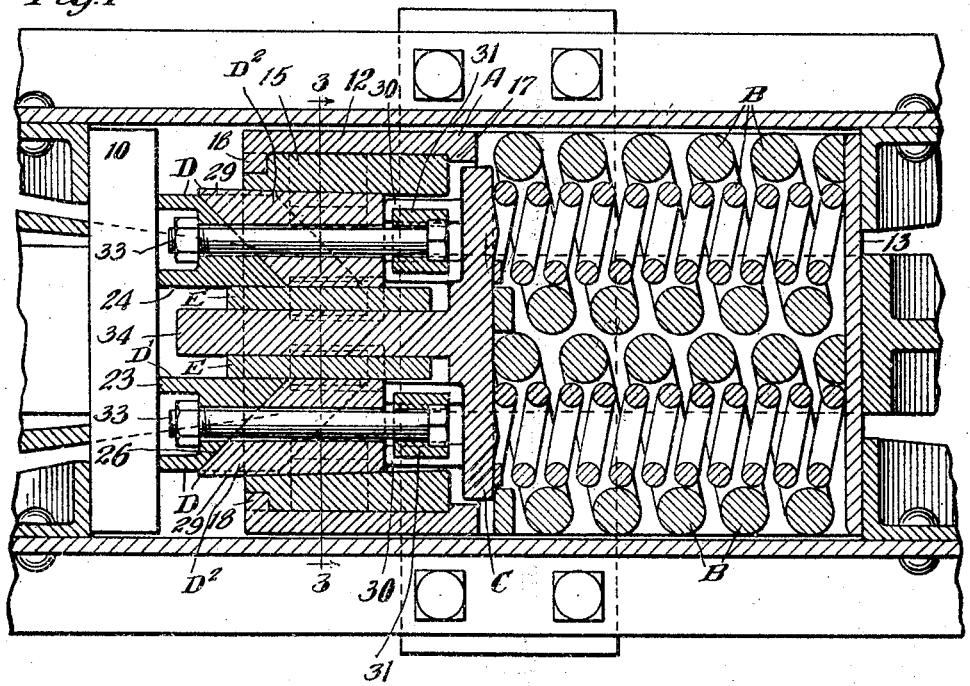
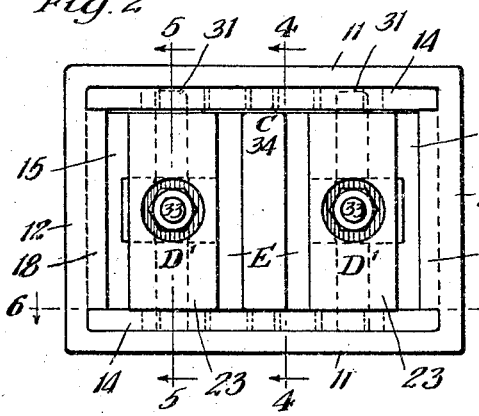
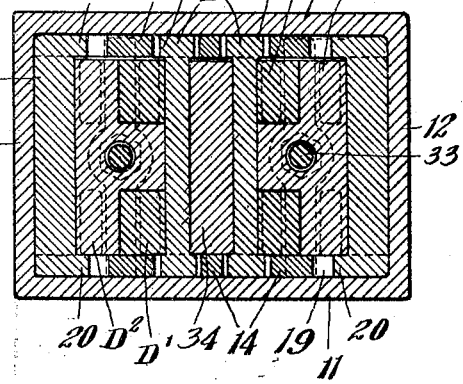
Witnesses
Wm. Geiger
Inventor
John F. O'Connor
By Geo. I. Haight
His Atty.

March 9, 1926.  
J. F. O'CONNOR  
1,575,706  
FRICTION SHOCK ABSORBING MECHANISM  
Filed Jan. 30, 1922   2 Sheets-Sheet 2
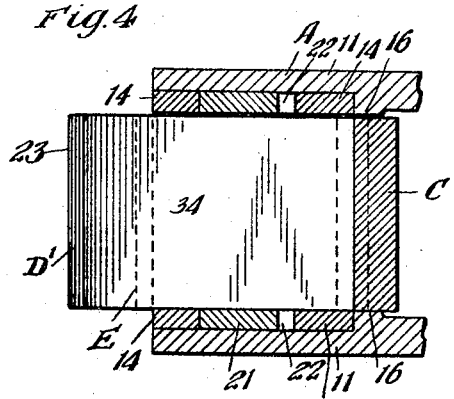
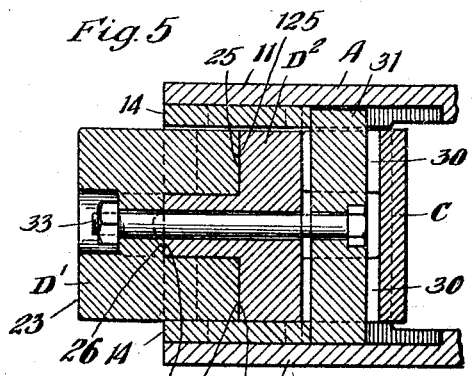
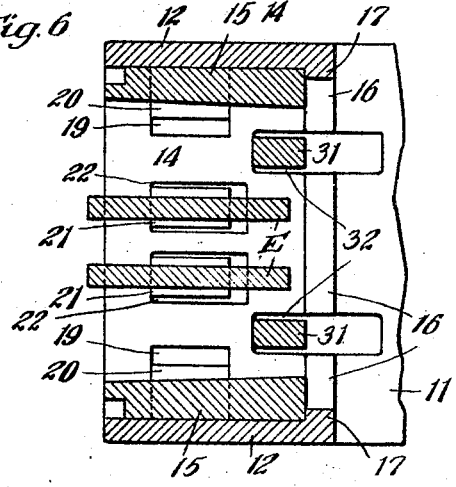
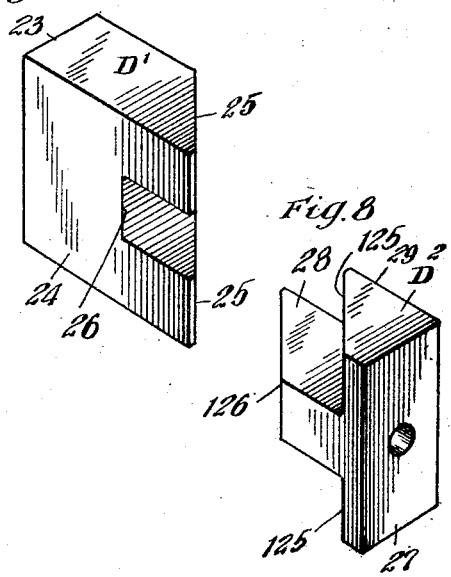
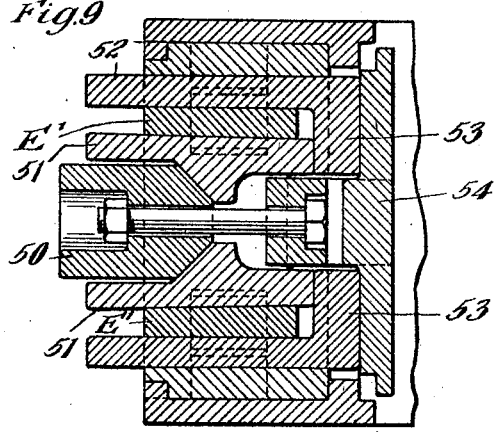
Witnesses  
Wm. Geiger
Inventor  
John F. O'Connor  
By Geo. S. Haight  
His Atty.

Patented Mar. 9, 1926.

1,575,706

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed January 30, 1922. Serial No. 532,615.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings wherein are obtained high capacity, a large amount of friction wearing area, and easy release.

A special object of my invention is to provide a mechanism of the character indicated wherein the effective spring resistance afforded certain of the movable friction elements is made greater than the actual capacity or resistance of the spring.

Another object of the invention is to provide a novel, strong, efficient and detachable lining for a friction shell, which lining may also be utilized effectively for anchoring friction plates or partitions to the shell.

In the drawings forming a part of this specification, Figure 1 is a horizontal, longitudinal, sectional view of a portion of a railway draft rigging showing my improvements in connection therewith. Figure 2 is a front end elevation of the shock absorbing mechanism proper, shown in Figure 1. Figure 3 is a vertical, transverse, sectional view of the mechanism proper corresponding to the section line 3—3 of Figure 1. Figures 4 and 5 are vertical, longitudinal, sectional views corresponding to the section lines 4—4 and 5—5 respectively of Figure 2. Figure 6 is a horizontal, sectional view corresponding to the section line 6—6 of Figure 2. Figures 7 and 8 are detail perspectives of the wedge-friction elements of one set employed with my improvements. And Figure 9 is a view similar to Figure 1 showing a somewhat different embodiment of the invention.

Referring first to the construction illustrated in Figures 1 to 8, inclusive. The shock absorbing mechanism proper is or may be mounted in the usual manner on the underframe of a car and operated as customary by a drawbar and yoke, there being a front follower 10 as best shown in Figure 1.

The improved shock absorbing mechanism, as shown, comprises preferably a combined friction shell and spring cage casting A; twin arranged springs B—B; a spring follower C; twin sets of friction elements, each set designated generally by the reference character D; relatively stationary friction plates or partitions E—E anchored to the casting A by an improved lining for the shell, hereinafter described. The casting A is of rectangular box-like form having top and bottom walls 11—11, side walls 12—12 and integral inner vertical wall 13, the latter cooperating with the rear stop lugs in the manner of a rear follower. The side walls 12 of the casting A are relatively short so as to leave the major portion of the sides of the casting A open to permit of the insertion and removal of the springs and certain other parts.

The friction shell proper of the casting A is at the front or outer end thereof and I have shown the casting as provided with a removable lining so as to facilitate renewals or repairs and also enable me to employ any desired metal on the friction generating surfaces independent of the metal of which the casting is made. Said improved lining, as shown, consists of top and bottom plates 14—14 and side plates 15—15. To anchor said plates to the casting, the latter is provided on the inner sides of the top and bottom walls 11 with transversely extending ribs 16—16 spaced inwardly from the end or mouth of the casting a distance corresponding to the width of the plates 14 and 15. On the inner side of each side wall 12 of the casting A, inner and outer sets of ribs 17 and 18 are provided, the former being in the same transverse plane as the ribs 16, and the ribs 18 being at the outer end of the casting as shown in Figure 1. Each of the plates 14, at each end thereof, has a transversely extending recess cut inwardly from the edge as indicated at 19—19, best in Figure 6. In alinement with the recesses 19, the side plates 15 at top and bottom thereof, are formed with inwardly extending flanges 20—20 which are slidable within said recesses and of a width less than the width of the recesses 19 in an amount corresponding to the thickness of the ribs 18.

The lining is assembled with the casting in the following manner. The top and bottom plates 14 are associated with the side plates 15 with the flanges 20 of the latter within the recesses 19 and with the two side plates 15 drawn inwardly toward each other as far as possible. The four plates, thus assembled, are then inserted through the open end of the shell until the inner edges of the plates 14 engage with the ribs 16, thus preventing further movement of the plates 14 inwardly. During this insertion of the plates, it is evident that the side plates 15 will clear the ribs 18 and after the plates 14 have engaged with the ribs 16, the side plates 15 are then spread apart laterally so as to engage them between the ribs 17 and 18. So long as the plates 15 are held in this outer position, (which of course will be true when all of the parts of the mechanism are assembled) the plates 15 can neither move inwardly or outwardly with respect to the casting A. The plates 14 are held against inward movement both by the ribs 16 and the plates 15 and are held against outward movement by the plates 15.

The improved detachable lining above described, enables me to employ a simpler casting for the friction shell than heretofore and, as hereinafter pointed out, by means of the lining shown, I am enabled to anchor the partitions or friction plates of a stationary character to the shell casting in an easier and more satisfactory manner than heretofore.

As hereinbefore mentioned, two relatively stationary friction plates or partitions E—E are employed within the friction shell. These are secured in place by providing each of them with top and bottom flanges 21 which are entered within corresponding openings 22 provided in the top and bottom plates 14 of the shell lining. By making the width of the openings 22 in excess of the transverse dimension of the flanges 21, it is evident that the latter may adjust themselves transversely of the shell in response to transverse or laterally applied pressure. Furthermore, the partitions or plates E may be allowed a slight amount of movement lengthwise of the shell by having the openings 22 of slightly greater length than the flanges 21, as best shown in Figure 6.

The use of the two partitions E divides the friction shell proper into three chambers, the central one of which is preferably smaller than the side chambers. In each of the side chambers is located a set of friction elements, each set consisting of two members generically designated D, as hereinbefore described, and shown in detail in Figures 7 and 8. These members, D' and D² are in the form of wedge-friction-shoe blocks. The element D' has an outer transverse face 23 adapted to engage the follower 10, a longitudinally extending friction surface 24 on one side and wedge faces 25—25 formed on vertically spaced forks at the inner end of the element D'. A corresponding wedge face 26 is formed at the bottom of the recess which defines the forks of the element D'.

The cooperating element D² has an inner transverse face 27 and a forwardly extended centrally disposed flange 28 which fits between the forks of the element D'. The forward end of the flange 28 is wedge-shaped as indicated at 126 and at the base of the flange, the element D² is provided with other wedge faces 125—125 cooperable with the wedge faces 25. On the side opposite to the friction surface 24, the element D² is also provided with a friction surface 29.

With the two sets of friction devices D arranged as shown in the drawing, best in Figure 1, the friction surfaces 29 of the elements D² engage with the outside friction surfaces of the shell which are provided by the plates 15 and the friction surfaces 24 of the elements D' engage with the corresponding adjacent partitions E.

Twin arranged springs B are employed, as hereinbefore mentioned, and a corresponding twin spring follower C is used. The latter is provided on the forward side thereof near each end, with a set of four prongs or lugs 30, as shown in Figures 1, 3 and 5, the forward ends of said prongs 30 engaging the face 27 of the corresponding set of friction elements D so as to transmit the spring resistance to the friction elements during the compression stroke. The prongs 30 are so arranged as to straddle vertically extending anchor bars 31—31, one for each set of friction elements D, the upper and lower ends of the anchor bars 31 entering slots 32—32 formed in the rear edges of the plates 14 so that said anchor bars 31 are limited in their movement outwardly of the shell by said plates 14. As shown in Figure 6, the ribs 16 are interrupted opposite the slots 32 so as to allow forward and backward movement of the anchor bars 31. The anchor bars 31 have attached thereto the inner ends of retainer bolts 33 which extend through the elements D' and D² and are anchored at their forward ends to the elements D' so as to hold the parts in assembled relation and also to permit of the spring being placed under an initial compression.

The spring follower C, at the center thereof on the front side, is provided with a forwardly extended heavy friction plate 34 which works within the central friction chamber and between the two partitions E.

Said plate 34 being integral with the spring follower or otherwise rigidly associated therewith, it is evident that the force necessary to move the spring follower C inwardly of the casting A equals the sum of the spring resistance proper and the frictional resistance encountered by the plate 34. With this arrangement therefore, it will be seen that I afford to the sets of friction elements D, a resistance which is substantially greater than the actual spring resistance, thus enabling me to obtain a much higher frictional capacity as compared with prior mechanisms having the same wedging angles, the same coefficient of friction and same spring capacity. Or, stated in another manner, as compared with prior devices having the same coefficient of friction and spring capacity, I am enabled to obtain the same total capacity for the mechanism by using blunter wedging angles, thereby facilitating release. In this connection, it will be noted that the outer end of the friction plate 34 is always held separated from the follower 10 and consequently does not receive any direct pressure from the drawbar.

In the arrangement shown in Figure 9, the same type of lining is employed for the friction shell and need not be redescribed. In this arrangement, two partitions or relatively stationary friction plates E' are employed, anchored to the lining without capacity for longitudinal movement inwardly of the shell. In the construction of Figure 9, the partitions E' are separated more than in the previously described construction so as to leave the central friction chamber relatively large and the side friction chambers relatively small. Within the central friction chamber, I employ a set of friction devices which consists of a wedge proper 50 and a pair of wedge-friction-shoes 51—51, the latter cooperating with the partitions E' as will be understood.

In each of the side friction chambers, I employ a friction plate or shoe 52, the latter having inwardly extended heavy flanges or feet 53 at the inner ends thereof upon which the inner ends of the shoes 51 bear. Said flanges 53 in turn rest upon the twin spring follower 54.

In the construction shown in Figure 9, it will be seen that I obtain the same advantages with respect to the multiplied effective spring resistance, inasmuch as the resistance afforded the central set of friction elements is that of the spring resistance proper plus the frictional resistance offered to the movement of the plates 52—52.

In Figure 9, the parts may be held in assembled relation by a suitable anchor bar and retainer bolt disposed centrally of the mechanism as shown. In both of the forms described, certain of the longitudinal friction surfaces may be converged inwardly of the shell, as shown, for the purpose of creating additional resistance and to facilitate release of the parts.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a hollow shell provided with a plurality of interior partitions dividing it into a plurality of chambers, said partitions being responsive to laterally applied pressure; of a spring resistance; a set of longitudinally movable friction elements in one of said chambers and laterally expansive under applied pressure; a spring follower between said spring resistance and the inner end of said set of friction elements; and a longitudinally movable friction member in another of said chambers, said member being rigid with said spring follower.

2. In a friction shock absorbing mechanism, the combination with a friction shell having two partitions on the interior thereof disposed near the center of the shell and dividing the latter into three friction chambers; of a set of friction elements in each of the side friction chambers; a friction plate in the central friction chamber cooperable with the partitions; a spring resistance; and means interposed between the inner ends of said sets of friction devices and said plate for moving the latter inwardly of the shell when said sets of friction devices are actuated during a compression stroke.

3. In a friction shock absorbing mechanism, the combination with a friction shell having two partitions on the interior thereof disposed near the center of the shell and dividing the latter into three friction chambers; of a set of friction elements in each of the side friction chambers; a friction plate in the central friction chamber cooperable with the partitions; a spring resistance; and means interposed between the inner ends of said sets of friction devices and said plate for moving the latter inwardly of the shell when said sets of friction devices are actuated during a compression stroke, said means including a spring follower rigid with respect to said friction plate.

4. In a device of the character described, the combination with an open-ended casing having an interior of polygonal shape and provided with ribs on the interor faces located inwardly from the end and ribs on the interior of a pair only of the faces on the outer end thereof; of liner plates on all of said interior faces bearing against said first named ribs, the liner plates on those faces having said outer ribs engaging the latter also and interlocking with the plates on the other faces.

5. In a device of the character described, the combination with a open-ended casing; of a detachable lining for said casing, said lining comprising a plurality of separable plates provided with interlocking means for positively preventing relative movement thereof longitudinally of the shell, some of said plates having shouldered engagement with the shell to prevent movement longitudinally thereof in either direction.

6. In a device of the character described, the combination with an open-ended casing; of a detachable lining for said casing comprising a plurality of separable interlocking plates, some of which have shouldered engagement with the shell to prevent movement longitudinally thereof; and an intermediate partition detachably interlocked with said lining.

7. In a device of the character described, the combination with a rectangular casing; of a detachable lining for said casing comprising four plates adapted to fit against the corresponding four inner faces of the shell, said four plates being detachably interlocked to prevent relative longitudinal movement therebetween, some of said plates being detachably interlocked with the shell to prevent longitudinal movement in either direction with respect thereto.

In witness that I claim the foregoing I have hereunto subscribed my name this 12th day of January 1922.

JOHN F. O'CONNOR.